F. H. DENNY.
OIL GUARD FOR AUTOMOBILES.
APPLICATION FILED SEPT. 4, 1917.
1,282,547.
Patented Oct. 22, 1918.
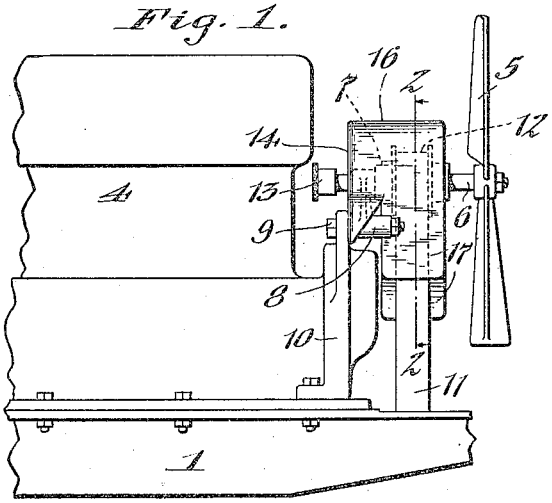
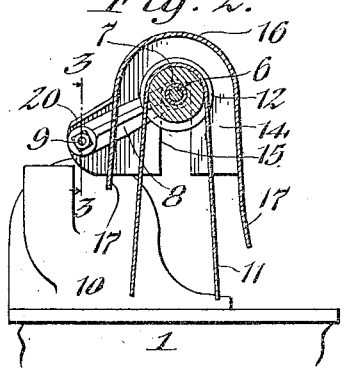
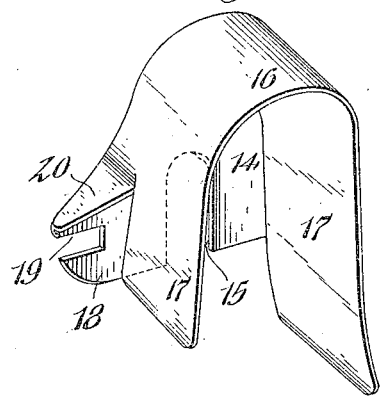
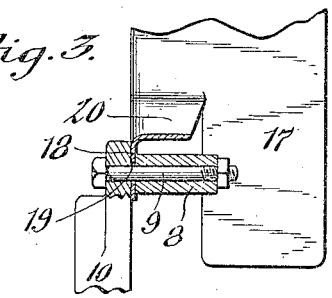
Inventor,
Frank H. Denny,
by Geyer Popp
Attorneys.

UNITED STATES PATENT OFFICE.

FRANK H. DENNY, OF BUFFALO, NEW YORK.

OIL-GUARD FOR AUTOMOBILES.

1,282,547.            Specification of Letters Patent.        Patented Oct. 22, 1918.

Application filed September 4, 1917. Serial No. 189,520.

*To all whom it may concern:*

Be it known that I, FRANK H. DENNY, a citizen of the United States, residing at Buffalo, in the county of Erie and State of New York, have invented new and useful Improvements in Oil-Guards for Automobiles, of which the following is a specification.

This invention relates to an oil guard for the fan-shaft bearings of automobiles, and more particularly those of Ford cars, although it is not limited to that particular use.

The object of the invention is the provision of an inexpensive guard of this character which is readily applicable to existing cars and which effectually prevents splashing of the lubricant against the inner side of the engine-hood and parts inclosed by it such as the electric wiring and the hose-connections of the radiator, in order to avoid soiling of the parts and premature deterioration of such connections and the insulation of the conducting wires.

In the accompanying drawings:

Figure 1 is a fragmentary side elevation of an automobile equipped with the guard. Fig. 2 is a transverse section on line 2—2, Fig. 1. Fig. 3 is an enlarged longitudinal section, on line 3—3, Fig. 2. Fig. 4 is a detached perspective view of the guard.

Similar characters of reference indicate corresponding parts throughout the several views.

In the drawings, the guard is shown in connection with a Ford car, 1 indicating the crank case; 4 the engine and 5 the fan mounted on the shaft 6. This shaft is supported in the bearing 7 carried by the usual arm or bracket 8 which is clamped by a horizontal bolt 9 to the fixed standard 10. The customary driving belt 11 passes over the pulley 12 of the fan shaft.

Grease is supplied to the bearing 7 by the usual cup 13.

In the preferred form of the oil guard shown in the drawings, the same is open at its front side and closed at its rear side by an upright wall 14 having a vertical notch 15 which receives the fan shaft and extends upwardly from the lower edge of said wall. In addition to this rear wall, the guard comprises an arched top or hood 16 extending forwardly therefrom, and side walls or aprons 17 forming downward continuations of said top and arranged on opposite sides of the driving belt 11. These guard-members inclose the fan shaft-bearing, the pulley and the upper portion of the driving belt, preventing the oil thrown off by the fan-shaft from splashing against the inner side of the usual engine hood and the radiator hose and electrical conductors, not shown, thus protecting the last named parts from the deteriorating effect of the oil. The guard also prevents the oil from flying through the ventilating slots of the hood and soiling the dash.

The guard may be supported by any suitable means. In the construction shown in the drawings, its rear wall is provided at one side with a laterally-projecting ear 18 which is clamped between the standard 10 and the bearing-bracket 8 by the bolt 9, this ear having a notch 19 which permits it to pass over said bolt without removing the latter or dismembering the parts. A web or brace 20 which connects the upper edge of the ear with the adjacent side wall of the guard serves to stiffen the ear.

This attaching device permits the ready application of the guard to existing automobiles without additional fastening means, and particularly to Ford cars.

The guard can be cheaply formed in a single piece either by stamping it of sheet metal or casting it of a suitable metal.

I claim as my invention:

1. An oil guard comprising an upright rear wall having a notch adapted to receive a shaft and an upright attaching ear projecting laterally from said wall and having a notch, a top portion extending forwardly from said wall and aprons extending downwardly from opposite sides of said top portion.

2. An oil guard comprising an upright rear wall having a notch adapted to receive a shaft, a top portion extending forwardly from said wall, side walls extending downwardly from opposite sides of said top portion, said rear wall having an integral upright ear extending laterally beyond one of said side walls and having a notch, and a web connecting said ear with said side wall.

3. The combination of a standard, a bracket clamped to said standard by a horizontal bolt and carrying a bearing, a shaft mounted in said bearing parallel with said bolt, and an oil guard comprising a rear wall having a notch which receives said shaft, a top portion extending forwardly from said wall and provided at opposite sides with depending aprons, and an upright attaching ear extending laterally beyond the adjacent apron and clamped between said standard and said bearing-bracket, said ear having a notch which receives said bolt.

FRANK H. DENNY.

Copies of this patent may be obtained for five cents each, by addressing the "Commissioner of Patents, Washington, D. C."